Nov. 25, 1930.  C. E. JOHNSON  1,782,428

OIL CONSERVING PISTON

Filed May 12, 1930

Inventor
Charles E. Johnson
By - Liverance and
Van Antwerp
Attorney

Patented Nov. 25, 1930

1,782,428

UNITED STATES PATENT OFFICE

CHARLES E. JOHNSON, OF MUSKEGON, MICHIGAN

OIL-CONSERVING PISTON

Application filed May 12, 1930. Serial No. 451,801.

This invention relates to an oil conserving piston construction particularly adapted for use in internal combustion engines which are used in motor vehicles.

In lubrication of engines, a film of oil is introduced between the piston and walls of a cylinder in which it operates and if such oil is carried upwardly to the combustion chamber above the piston, it results in the oil being burned with the formation of carbon and an enhanced consumption of oil. It has been common practice to use openings through the sides of the piston, usually leading from a piston ring groove inwardly, and to provide an oil scraping and collecting piston ring in said groove by means of which any excess of oil over that needed for lubrication is carried into the ring groove and therefrom through said openings to the interior of the piston, which at relatively low speeds of the engine is satisfactory and a marked improvement over pistons not having such construction.

However, at the higher speeds of the engine, at which the pistons reciprocate very rapidly in the cylinder, on the down stroke of the piston air is more or less trapped and compressed underneath the piston and has a tendency to force itself outwardly through said oil drainage passages and force the oil back to the walls of the cylinder, rendering the drainage construction described ineffective so that at the higher speeds of engine performance an excess of oil is used and, therefore, wasted.

It is a primary object and purpose of the present invention to provide a very simple and effective automatic means in conjunction with the oil drainage openings of a piston, which is operated through alternate production of air compression underneath the piston and vacuum alternating with the same, caused by the reciprocatory movement of the piston, so as to close the passages when there is a compression of the air and open the same during the periods of vacuum. The compression of the air takes place on the down stroke of the piston and vacuum is produced on the up stroke thereof.

An understanding of the invention may be had from the following description, taken in connection with the accompanying drawing, in which, Fig. 1 is a vertical section through a cylinder having a reciprocating piston mounted therein and having my invention applied thereto.

Like reference characters refer to like parts in the different figures of the drawing.

Figure 1:
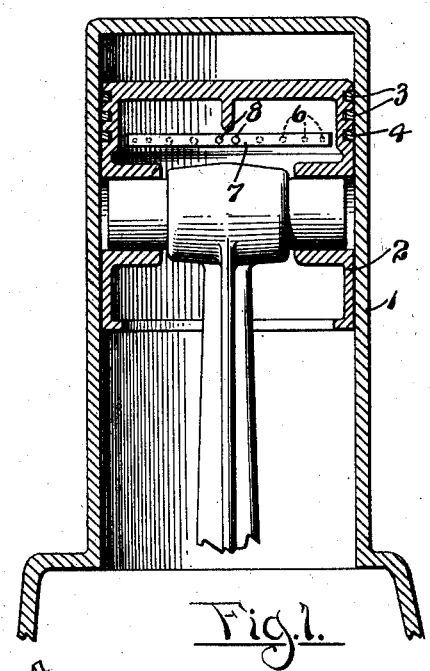

The cylinder 1 is of any preferred form of construction in which a piston 2 is mounted for reciprocation in the usual manner. The upper end portion of the piston is thickened at its sides in order that ring grooves may be formed in which piston rings 3 and 4 are located. The piston ring 4, preferably in the lowermost ring groove, is of any suitable oil drainage construction having a plurality of inwardly and upwardly cut slots 5 therein around it through which the oil may pass as it is scraped from the walls of the cylinder to the bottom of the ring groove on the down stroke of the piston. A plurality of drainage openings 6 are made through the bottom of said piston ring groove wall inwardly to the interior of the piston in order that the oil collected in the ring groove will pass to the interior of the piston and thence to the crank case.

With my invention a plurality of arc shaped thin elongated metal plates 7 are permanently secured to the inner side of the piston and anchored against turning movement with respect thereto by means of rivets 8 or equivalent fastening devices, the members 7 being located horizontally and at the inner ends of the passages 6. The plates 7 are of spring material and move back and forth toward and away from the ends of the openings 6 forming a very quick acting check valve. The curvature of the plates is substantially the same as the inner surface of the piston where applied.

Figure 3:
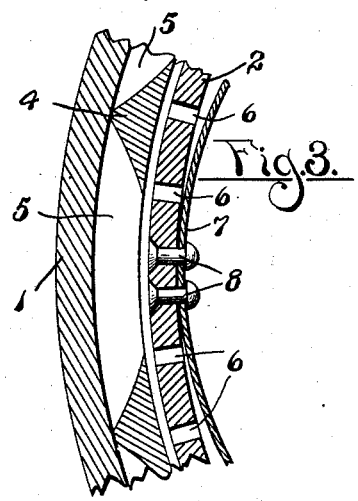
Fig. 3 is a fragmentary horizontal section, the plane of the section being taken through the horizontal oil drainage openings in the piston.

On the up stroke of the piston the vacuum which occurs at the inside of the piston and the pressure of the oil which is trapped behind the ring serves to draw and force the free end portions of the plates 7 from the inner sides of the piston, as in Fig. 3, to uncover the drainage passages 6 and permit the oil to pass freely to the interior of the piston as it will do by reason of the vacuum and pressure of the oil which is behind the ring. On the down stroke of the piston, however, any compression of the air which would tend to force the oil in the wrong direction through said passages causes the free end portions of plate 7 to be pressed against the inner sides of the piston and cover said passages, thereby preventing any action of the compressed air which would force the oil outwardly toward the walls of the cylinder. It is, of course, to be understood that as many of the oil drainage passages 6 may be used as found desirable. Preferably two of the plates 7 will be used, one at each side of the piston, but this number can be increased if it is better.

Figure 4:
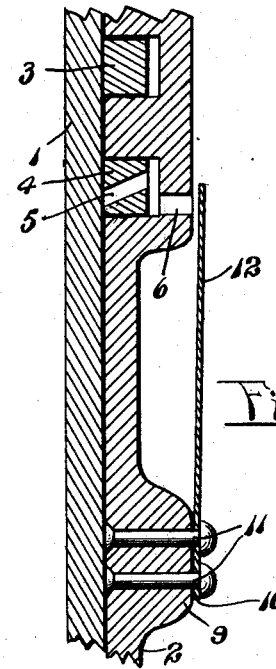
Fig. 4 is a fragmentary vertical section, similar to that shown in Fig. 2, illustrating a modification in construction, and, Fig. 5 is a vertical section through a piston with the form of invention, illustrated in Fig. 4, used therewith.
Figure 2:
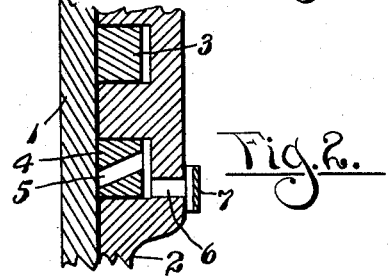
Fig. 2 is a fragmentary enlarged vertical section through the cylinder and adjacent portion of the piston.
Figure 5:
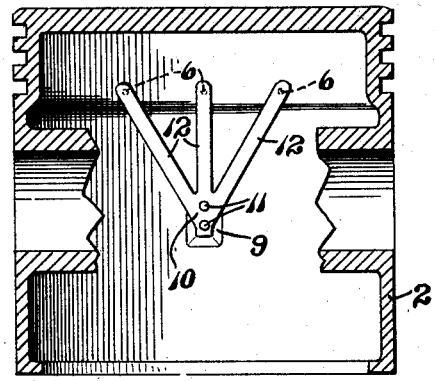

In Figs. 4 and 5 a modification of the construction is shown. At a lower portion of the piston at the inner sides thereof bosses 9 are made to each of which a thin metal member 10 is permanently secured by rivets 11, the upper portion of the member being divided to provide spring fingers 12 which extend upwardly so that one of said fingers comes opposite the inner end of each of the drainage openings 6. There will be as many fingers as drainage openings at a side of the piston. The movement of the fingers 12 to close the ends of the passages 6 on the down stroke of the piston and their inward movement to uncover said passages on the up stroke of the piston occurs the same as described with reference to the construction shown in Figs. 1 to 3 inclusive.

The construction described is a very simple and economical one for the attainment of the ends desired. The principle of operation upon which the device works is that the changing air pressure underneath the piston above and below normal atmospheric pressure serves to close and open the oil passages 6, closing them at the time when they should be closed and opening them at other times for the passage of the oil to the interior of the piston.

The invention is defined in the appended claims and is to be considered comprehensive of all forms of structure coming within their scope.

I claim:

1. A piston provided with a groove around the same in which oil may enter and having oil drainage openings from said groove to the interior of the piston, and means attached to the inner side of the piston and extending over the inner ends of said oil drainage passages, automatically operated by the increase and decrease of air pressures within the piston over and under normal pressure, to move said means into closing engagement with the ends of said passages on increase of air pressure above normal pressure and away from the inner ends of said passages to open the same on decrease of air pressure below normal pressure.

2. A piston provided with a groove around the same in which oil may enter and having oil drainage openings from said groove to the interior of the piston, and means attached to the inner side of the piston and extending over the inner ends of said oil drainage passages, automatically operated by the increase and decrease of air and oil pressures within the piston and groove over and under normal pressure, to move said means into closing engagement with the ends of said passages on increase of air pressure above normal pressure and away from the inner ends of said passages to open the same on decrease of air and increase of oil pressure below normal pressure.

3. A piston adapted to have reciprocatory movements having oil drainage passages through its sides, said piston when reciprocated at high speed in one direction compressing air within the same and when moving in the other direction reducing the pressure of air below normal pressure, and flexible means attached to the inner sides of the piston in position to be forced by the pressure of air above normal pressure into closing engagement with the inner ends of said drainage passages and automatically open said passages when the pressure of air is reduced below normal pressure.

4. A piston adapted to be mounted for vertical reciprocatory movements, having oil drainage passages through the sides thereof and means for collecting excess oil from the walls of a cylinder in which said piston reciprocates and delivering the same to said passages, and a flexible member secured to the inner side of the piston and extending over the inner ends of said oil drainage passages and automatically operated by the varying air pressures underneath the piston when the same is reciprocated to close said passages on the down stroke of the piston and open the same on the up stroke thereof.

5. A piston adapted to be mounted for vertical reciprocatory movements, having oil drainage passages through the sides thereof and means for collecting excess oil from the walls of a cylinder in which said piston reciprocates and delivering the same to said passages, and a flexible member secured to the inner side of the piston and extending over the inner ends of said oil drainage passages and automatically operated by the varying air and oil pressures underneath the piston and ring when the same is reciprocated to close said passages on the down stroke of the piston and open the same on the up stroke thereof.

6. In combination with the vertically positioned cylinder, a piston mounted therein for vertical reciprocations, said piston having oil drainage passages through the sides thereof, and a space around the piston in which excess oil collects, under the ring said passages leading from the space to the interior of the piston, and an elongated flexible member permanently secured to the inner side of the piston and lying horizontally over the inner ends of said oil drainage passages and adapted to move into closing engagement therewith and away therefrom to open and close the same on the down and up movements of the piston, respectively.

7. In combination, a vertical cylinder, a piston mounted for reciprocation thereon, means for removing and collecting excess oil from the walls of the cylinder and passing the same to the interior of the piston, including oil drainage passages through the sides of the piston and means secured to the inner sides of the piston automatically operable by pressure of air under the piston to close said drainage openings on the down stroke of the piston and open the same on the up stroke thereof.

8. A piston having a plurality of oil drainage openings therethrough to carry oil to the interior of the piston, and a thin flexible resilient member of metal permanently secured to the inner side of the piston and extending over the inner ends of the plurality of said oil drainage passages, for the purposes described.

9. A piston having an oil drainage opening therethrough, and a thin resilient member permanently secured to the inner side of the piston and extending over said opening adapted to be automatically moved to close said opening on movement of the piston in one direction and uncover the opening on movement of the piston in the opposite direction, said movement of the flexible member being actuated through variations of pressure of the air inside the piston.

10. A piston having an oil drainage opening therethrough, and a thin resilient member permanently secured to the inner side of the piston and extending over said opening adapted to be automatically moved to close said opening on movement of the piston in one direction and uncover the opening on movement of the piston in the opposite direction, said movement of the flexible member being actuated through variations of pressure of the air and oil inside the piston and piston ring groove.

In testimony whereof I affix my signature.

CHARLES E. JOHNSON.